Feb. 24, 1942.  C. R. HUBBARD  2,273,962
MACHINERY PACKING
Filed June 7, 1940
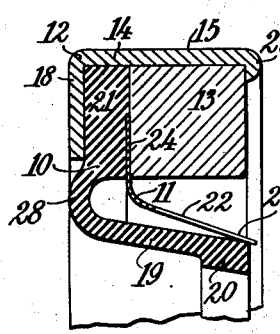
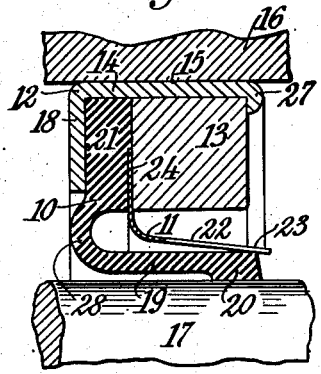
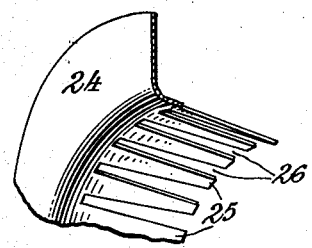
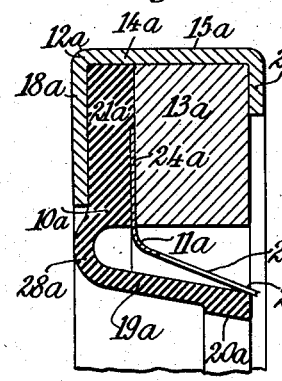
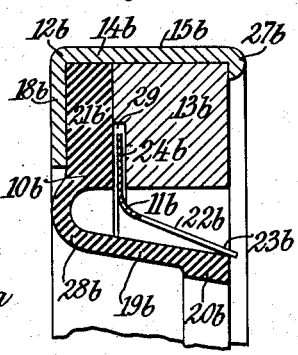
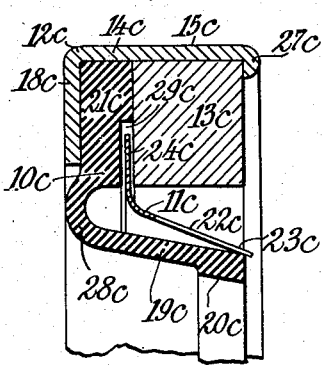
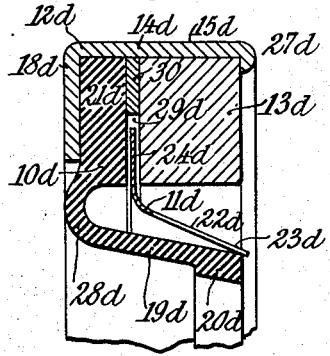
INVENTOR
Cecil R. Hubbard,
BY Fraser, Myers & Manley,
ATTORNEYS.

Patented Feb. 24, 1942

2,273,962

UNITED STATES PATENT OFFICE 2,273,962

MACHINERY PACKING

Cecil R. Hubbard, Palmyra, N. Y., assignor to The Garlock Packing Company, Palmyra, N. Y., a corporation of New York Application June 7, 1940, Serial No. 339,225

7 Claims. (Cl. 288—3)

This invention relates to improvements in machinery packings, and is particularly adapted for use as an oil seal for the space between a rotary shaft and its housing or between analogous relatively movable machine elements.

It is an object of the invention to provide a sealing device of the above-mentioned character comprising a flexible sealing element and a spring mounted in a metal shell, parts of the device being of such construction as to be flexible to an extent such as to provide not only for the expansion of the lip of the sealing device to permit it to be assembled with the shaft with which it is designed to be used, but also such as to provide for further deformation of the sealing device and its spring which might be caused by movements of the shaft to positions eccentric with respect to its housing due to oscillation, wearing of the parts, or other exacting conditions of service.

In the accompanying drawing illustrating preferred forms of the invention—

Figure 1 is a fragmentary cross-sectional view of one form of oil-seal device embodying the invention.

Fig. 2 is a fragmentary cross-sectional view of the form of oil-seal device illustrated by Fig. 1 as assembled with a shaft and its housing.

Fig. 3 is a fragmentary perspective view of a spring adapted for use as an element of the oil-seal device illustrated by Fig. 1.

Fig. 4 is a fragmentary cross-sectional view of a modified form of oil-seal device of greater radial depth than that of the form illustrated by Fig. 1.

Fig. 5 is a fragmentary cross-sectional view of another modified form of oil-seal device embodying the invention and having an annular recess therein for an outwardly disposed flange of the spring by which it is held in assembled relation with other parts of the device to provide for a floating movement of the spring as a whole.

Figs. 6 and 7 are fragmentary cross-sectional views of further modified forms of the device illustrating different ways in which the recess for the flange of the spring may be provided.

In the form of the invention illustrated by Figs. 1, 2 and 3, the sealing device comprises in general a flexible sealing element 10, a spring 11, a metal shell 12 and a ring 13 by means of which the sealing element and spring may be clamped in an assembled relation with the shell.

The shell 12 may comprise an annular element 14, having an outer cylindrical surface 15 which may be mounted in fluid-tight association with a housing 16 surrounding a shaft 17 with which the sealing device is designed to be assembled.

The element 14 may have at one of its margins an inwardly directed flange 18 of a radial dimension such that its inner margin will be of materially greater diameter than the diameter of the shaft which it surrounds.

The sealing element 10 may comprise a sleeve-like portion 19 adapted to extend along a portion of the shaft surrounded by the shell.

The sleeve-like portion may have at one of its ends a lip 20 to be held in fluid-tight contact with the shaft, and it may be provided at its opposite end with an outwardly extending flange 21 adapted to be backed by the inwardly disposed flange of the shell.

The spring 11 may comprise a conical portion 22 so disposed that one of its marginal portions 23 will encircle the terminal lip 20 of the sleeve 19, and the conical portion may have at its opposite margin an outwardly disposed flange 24 by which it may be held in an assembled relation with other parts of the device.

The terminal marginal portion 23 of the spring may preferably be divided into a circumferential series of flexible fingers 25 (see Fig. 3), as by a succession of spaced incisions 26 which may be extended toward the flanged margin of the spring as far as may be necessary to provide the requisite degree of flexibility, or, if desired, may be further extended into and partway across its marginal flange 24, and the dimensions and degree of inclination of the conical portion may be such that the end portions of the fingers will make contact with the terminal lip of the sealing device only and hold the lip in its sealing relation with the shaft.

The sealing element and spring may be fixedly mounted in an assembled relation in the shell by means of the clamping ring 13; the flange 21 of the sealing element, the flange 24 of the spring, and the said clamping ring being held in a state of compression between the marginal flange 18 of the shell and a lip 27 which may be turned inwardly from the opposite margin of the element 14 of the shell.

When clamping the parts of the device between the flange 18 and the inturned lip 27 they may be subjected to a compression such as to hold the flange of the sealing element in fluid-tight contact with the inner surface of the flange 18 of the shell.

As an important feature of the invention the sleeve 19 of the sealing element is united with its flange 21 by an intermediate hinge-like portion 28, which may perhaps be aptly designated a gooseneck connection, and where this term is used to identify this flexible connecting portion of the sealing element throughout the specification and claims of this case it is intended to means that the connection is of reverse curvature such as is illustrated in the drawing. Its purpose, as has already been explained, is to so unite the sleeve 19 and the lip 20 of the sealing device to the flange 21 that the sleeve may not only be expanded to the position in which it is illustrated in Fig. 2 when it is assembled with the shaft 17, but that provision will also be made for further deformation of parts of the sealing device which may be occasioned by movements of the shaft to an eccentric position due to wear of parts or to oscillation of the shaft, or other causes.

The character of metal used in the construction of the spring 11, the thickness of the metal, and the division of its conical portion into fingers as indicated in Fig. 3, will be such as to afford a degree of flexibility which will also provide for eccentric movements of the shaft as well as expansion of the sleeve and lip of the sealing element to permit it to be assembled with the shaft.

The form of the invention illustrated by Fig. 4 differs from that illustrated by Figs. 1, 2 and 3 only in that it is of greater radial depth, in view of which the radial dimensions of the flanges of the sealing element and shell, 21a and 18a, respectively, as well as that of the clamping ring 13a, are correspondingly greater, and in view of which a lip 27a of material width is spun or otherwise turned inwardly from the margin of the shell opposite that which backs the flange of the sealing element, in order to afford a substantial backing for the relatively deep clamping ring which is subjected to compression between the lip and portions of the flanges of the sealing element and spring. Since corresponding parts of the forms of the invention represented by Figs. 1 and 4 are designated by like reference characters, except that the letter a has been added to each character applied to the form illustrated by Fig. 4, any further description of that form of the invention will be unnecessary.

The form of the invention illustrated by Fig. 5 differs essentially from the form illustrated by Figs. 1, 2 and 3, in that a recess 29 is provided between the flange 21b of the sealing element and the clamping ring 13b to receive the outwardly directed flange 24b of the spring 11b. This recess 29 is of a width and radial depth such as to permit the spring to have a limited degree of free movement in a direction perpendicular to the axis of the sealing device.

When the recess 29 is incorporated as a feature of the sealing device it is not necessary that the resiliency of the conical portion of the spring be sufficient to allow for movements of the shaft, with which the device is used, to positions which are eccentric with respect to the housing.

The spring may be analogous to the one illustrated by Fig. 3 as an element of the form of the invention represented by Figs. 1 and 2, and should have fingers of sufficient resilience to provide for the expansion of the sleeve and its sealing lip when the device is assembled with a shaft, as the form of the invention illustrated by Fig. 1 is indicated as having been assembled by Fig. 2. However, movement of the spring as a whole in directions perpendicular to the axis of the shaft to allow for eccentric movements of the shaft will be permitted by the floating movement of the spring in the recess 29.

It will be apparent that, when the form of the invention embodying the recess 29 is used, the spring may be made of different metal or of relatively heavier stock, or the incisions between the fingers need not extend to so great a distance from the terminal margin of the spring toward its outwardly directed flange as when the form of the invention is used in which the flange is rigidly clamped between the flange of the sealing element and the clamping ring, as in the case of the form illustrated by Fig. 1.

Since corresponding elements of the forms of the invention illustrated by Figs. 1 and 5, other than those which have already been mentioned, are designated by like reference characters, except that the letter b has been added to each of the reference characters applied to Fig. 5, further description of the form of the invention illustrated by that figure will be unnecessary.

The forms of the invention illustrated by Figs. 6 and 7 differ from that illustrated by Fig. 5 only as to details of construction as to the manner of providing the recess 29c of Fig. 6 and the recess 29d of Fig. 7 as substitutes for the recess 29 of Fig. 5.

The recess 29 of the form of the invention illustrated by Fig. 5 is provided by rabbeting the inner marginal surface of the clamping ring 13b which faces the opposing, inner marginal portion of the flange 21b of the sealing element.

In the form of the invention illustrated by Fig. 6 the recess 29c is provided by rabbeting the inner marginal surface of the flange 21c of the sealing element which faces the inner marginal portion of the opposing surface of the clamping ring 13c.

In the form of the invention illustrated by Fig. 7 the recess 29d is provided by inserting a separator in the form of a relatively thin, perforated disk 30 between the outer marginal portions of the flange 21d of the sealing element and the clamping ring 13d.

Since corresponding parts of the forms of the invention illustrated by Figs. 1, 6 and 7, other than those already mentioned, are designated by like reference characters, except that the letter c has been added to each of said characters applied to Fig. 6, and that the letter d has been added to each of such characters applied to Fig. 7, no further description of the forms of invention illustrated by Figs. 6 and 7 is required.

The invention is not intended to be limited to any of the specific forms which have been selected for purposes of illustration, but should be regarded as including modifications and variations thereof within the scope of the appended claims.

What is claimed is:

1. A device adapted to seal the space between a shaft and its housing; said device comprising a metal shell to be mounted fluid-tight in the housing and having an inwardly disposed marginal flange of dimensions such as to clear the shaft; a flexible sealing element having a sleeve to extend along a part of the shaft to be surrounded by the shell, said sleeve terminating at one end in a lip to be held in contact with the shaft and having at its opposite end an outwardly disposed flange backed against the flange of the shell and connected with the sleeve by a relatively thin, flexible, hinge-like, gooseneck portion of reverse curvature, one end of which merges with the sleeve and the other end with the flange; contractile resilient means surrounding and adapted to yieldably maintain the lip of the sealing element in its sealing relation with the shaft; and means for holding the sealing element and its contractile means in an assembled relation with the shell with the entire hinge-like, gooseneck element spaced from, so as to be free of restrictive contact with, the adjacent parts of the structure.

2. The device defined by claim 1, of which the contractile resilient means comprises a spring having a conical portion surrounding and extending along a part of the sleeve of the sealing element, the said conical portion having one of its marginal portions so positioned as to encircle the terminal lip of the sealing element and having at its opposite margin an outwardly disposed flange by which it may be held in an assembled relation with other parts of the device, the free marginal portion of the spring being divided into a circumferential series of resilient fingers, as by a succession of spaced incisions, and the dimensions of the conical portion being such as to cause the end portions only of the fingers to be held in yielding contact with the lip of the sealing element; and of which the means for holding the sealing element and its contractile means in an assembled relation with the shell comprises an inturned lip on the margin of the shell opposite that which backs the flange of the sealing element, and a clamping ring, backed by said lip, between which and the flange of the shell the flanges of the sealing element and its spring may be confined with the former held compressed in fluid-tight contact with the shell.

3. A device adapted to seal the space between a shaft and its housing; said device comprising a metal shell to be mounted fluid-tight in the housing and having an inwardly disposed marginal flange of dimensions such as to clear the shaft; a flexible sealing element having a sleeve to extend along a part of the shaft to be surrounded by the shell, said sleeve terminating at one end in a lip to be held in contact with the shaft and having at its opposite end an outwardly disposed flange backed against the flange of the shell; a spring having a conical portion surrounding and extending along a part of the sleeve of the sealing element, the said conical portion having one of its marginal portions so positioned as to encircle the terminal lip of the sealing element and having at its opposite margin an outwardly directed flange by which it may be maintained in an assembled relation with other parts of the device, the free marginal portion of the spring being divided into a circumferential series of resilient fingers, as by a succession of spaced incisions, and the dimensions of the conical portion being such as to cause the end portions only of the fingers to be held in yielding contact with the lip of the sealing element; and means, comprising an inturned lip on the margin of the shell opposite that which backs the flange of the sealing element and a clamping ring held in a state of compression between said lip and a portion of the flange of the sealing element, by which said flange may be held in fluid-tight contact with the backing flange of the shell, the surface portions of the sealing element and its clamping means which are adjacent opposed portions of the outwardly directed flange of the spring being of forms and dimensions such as to provide an annular recess therefor, the lateral walls of the recess being spaced from each other a distance sufficiently greater than the thickness of the flange of the spring to provide a working clearance therefor, and the outer confining wall of the recess being of a diameter greater than that of the periphery of the flange of the spring, whereby the spring may be free to float when occasioned to do so by eccentric movements of a shaft with which the sealing device may be assembled.

4. The device defined by claim 3, of which the sleeve of the sealing element is connected with its flange by means of a flexible, hinge-like, gooseneck portion of reverse curvature one end of which merges with the sleeve and the other with the flange.

5. The device defined by claim 3, of which the annular, radial recess for the flange of the spring is formed by providing the surface of the clamping ring which faces the flange of the sealing device with an annular rabbet about its inner margin.

6. The device defined by claim 3, of which the annular, radial recess for the flange of the spring is formed by providing the surface of the flange of the sealing element which faces the clamping ring with an annular rabbet about its inner margin adjacent its connection with its sleeve.

7. The device defined by claim 3, of which the annular, radial recess for the flange of the spring is formed by inserting a perforated disk adapted to serve as a separator between the outer portions of the flanges of the sealing element and its clamping ring.

CECIL R. HUBBARD.